United States Patent
Taylor et al.

(10) Patent No.: US 9,268,538 B2
(45) Date of Patent: Feb. 23, 2016

(54) METADATA DRIVEN USER INTERFACE SYSTEM AND METHOD

(75) Inventors: Jacob Taylor, Santa Clara, CA (US); Majed Itani, San Jose, CA (US); Roger Smith, Morrisville, NC (US)

(73) Assignee: SugarCRM Inc., Cupertino, CA (US)

( * ) Notice: Subject to any disclaimer, the term of this patent is extended or adjusted under 35 U.S.C. 154(b) by 2367 days.

(21) Appl. No.: 12/062,511

(22) Filed: Apr. 4, 2008

(65) Prior Publication Data

US 2008/0276218 A1    Nov. 6, 2008

Related U.S. Application Data

(60) Provisional application No. 60/927,332, filed on May 2, 2007.

(51) Int. Cl.
*G06F 9/44* (2006.01)
*G06F 13/00* (2006.01)

(52) U.S. Cl.
CPC ... *G06F 8/38* (2013.01); *G06F 8/30* (2013.01)

(58) Field of Classification Search
USPC .......................................................... 717/106
See application file for complete search history.

(56) References Cited

U.S. PATENT DOCUMENTS

| | | | |
|---|---|---|---|
| 6,601,233 B1 * | 7/2003 | Underwood | 717/102 |
| 7,516,440 B2 * | 4/2009 | Upton | 717/106 |
| 7,546,576 B2 * | 6/2009 | Egli | 717/106 |
| 2003/0179232 A1 | 9/2003 | Fousek et al. | |
| 2004/0064351 A1 | 4/2004 | Mikurak | |
| 2004/0103396 A1 * | 5/2004 | Nehab | 717/127 |
| 2004/0249867 A1 * | 12/2004 | Kraiss et al. | 707/203 |
| 2005/0071853 A1 * | 3/2005 | Jones et al. | 719/328 |
| 2005/0197880 A1 * | 9/2005 | Walsh et al. | 705/8 |
| 2005/0257190 A1 * | 11/2005 | Shaburov et al. | 717/106 |
| 2006/0195379 A1 | 8/2006 | Abecassis et al. | |
| 2006/0206861 A1 * | 9/2006 | Shenfield et al. | 717/106 |
| 2006/0277087 A1 | 12/2006 | Error | |

OTHER PUBLICATIONS

International Search Report, PCT/US08/04378, dated Jul. 7, 2008.
Written Opinion, PCT/US08/04378, dated Jul. 7, 2008.

* cited by examiner

*Primary Examiner* — Don Wong
*Assistant Examiner* — Mohammad Kabir
(74) *Attorney, Agent, or Firm* — Steven M. Greenberg, Esq.; CRGO LAW

(57) ABSTRACT

A metadata driven user interface system and method are provided. In an exemplary embodiment, a software-based customer relationship management system and method may include the metadata driven user interface system.

10 Claims, 7 Drawing Sheets

METADATA DRIVEN USER INTERFACE SYSTEM AND METHOD

PRIORITY CLAIM

This application claims the benefit under 35 USC 119(e) of U.S. Provisional Patent Application Ser. No. 60/927,332 filed on May 2, 2007 and entitled "Metadata Driven User Interface System and Method", the entirety of which is incorporated herein by reference.

FIELD

The invention relates generally to a software system and method that has a metadata driven user interface system and method.

BACKGROUND

Software systems are well known. One example of a software system is a customer relationship management (CRM) system and solution. For example, typical known CRM systems include Microsoft® CRM, SalesForce, a CRM product provided by SalesForce.com, Netsuite CRM, and SAP Business One CRM. However, conventional CRM systems have significant limitations that include a lack of flexibility, high costs, and a closed-source structure which is embedded into the traditional product offerings. These systems also do not have metadata driven user interface capabilities. These limitations have led to a failure rate of over 70% with traditional CRM implementations. Thus, it is desirable to provide a metadata driven user interface system and method.

SUMMARY

A metadata driven user interface system and method are provided. In one implementation of the system, a customer relationship management (CRM) system may use the metadata driven user interface system.

BRIEF DESCRIPTION OF THE DRAWINGS

FIG. 5 illustrates an exemplary user interface of the CRM system with a drop down menu defined by the metadata; and FIG. 6 an exemplary user interface of the CRM system for defining field level security of the CRM system using metadata.

DETAILED DESCRIPTION OF AN EXEMPLARY EMBODIMENT

The system is particularly applicable to a metadata driven user interface in an open source-based customer relationship management software system and it is in this context that the system will be described. It will be appreciated, however, that the metadata driven user interface system and method has greater utility since it may be used with any software system or any implementation and is not limited to the implementation described below. For purposes of illustration, however, the described system is an implementation in a customer relationship management (CRM) and groupware system. In the example, the CRM and groupware system is SugarCRM Inc.'s Sugar Enterprise 5.0.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1A:
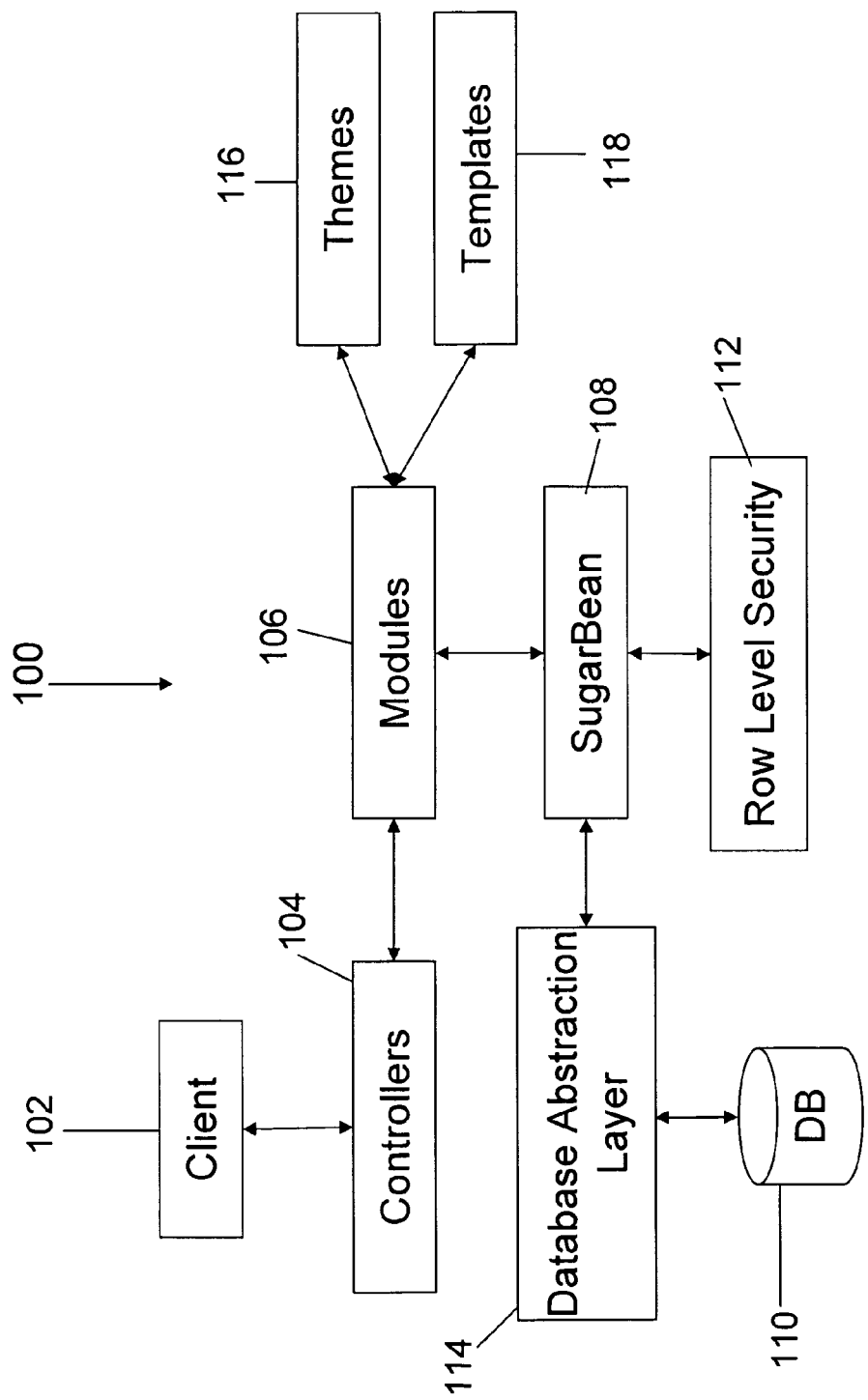
FIG. 1A is a diagram illustrating a customer relationship management system that may incorporate a metadata driven user interface system and method.
Figure 1B:
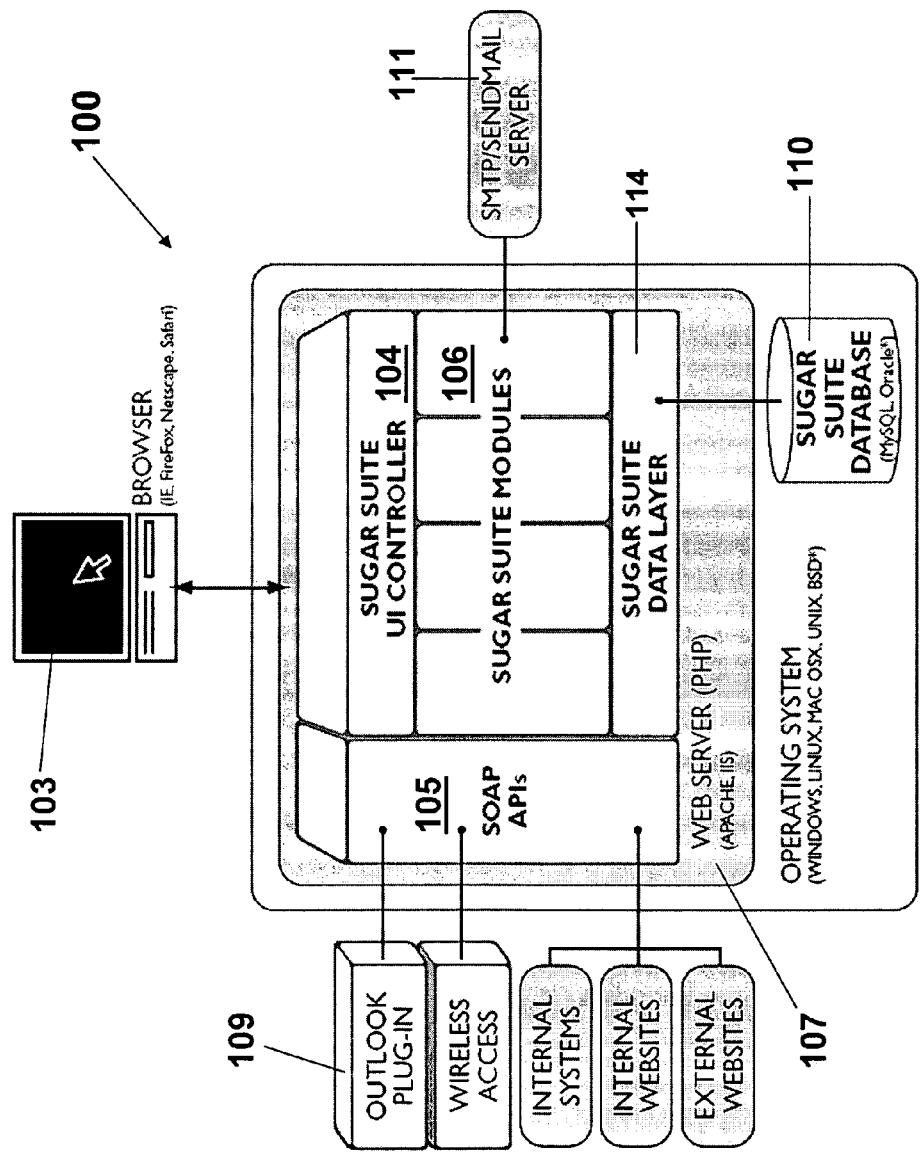
FIG. 1B illustrates more details of the customer relationship management system that incorporates the metadata driven user interface system and method.

FIG. 1A is a diagram illustrating a customer relationship management (CRM) system 100 that is an example of a software-based business software application. In one embodiment, the system 100 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 110 that stores the data associated with the system 100. The system may have one or more clients 102, such as a browser application executed on a typical computing device (a browser client session), that accesses the system over a communications network 103 such as the Internet, a cellular network, a wireless network and the like. The computing devices may include a laptop, table or desktop computer system, a PDA, a mobile phone, a portable wireless email device and the like. The client's 102 interactions with the system are managed and go through a set of one or more controllers 104. The controllers 104 are the entry-point into the system for an entity that is using the system wherein the entity may be a person who accesses the system, such as by using a browser application, a computing device or a software program that uses this entry point. The controllers 104 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 106 that are components of application functionality and provide certain functionality to the entity accessing the system. The modules 106 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 108 and each module references the SugarBean to retrieve the data from the database 110 required for display and uses certain functions and operations instantiated in the SugarBean base object.

Figure 2:
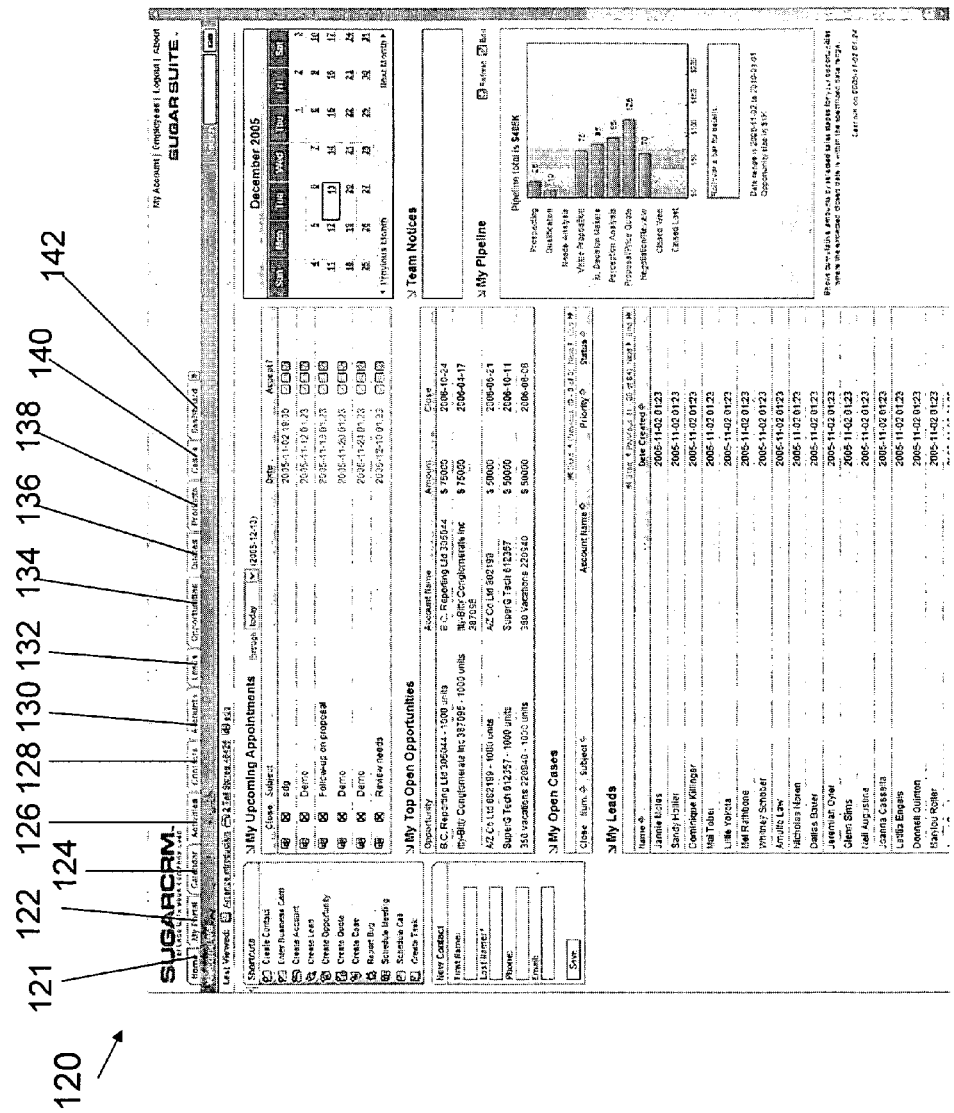
FIG. 2 is a diagram illustrating an example of the user interface of the system in FIGS. 1A and 1B.

FIG. 2 is a diagram illustrating an example of the user interface 120 of the system in FIGS. 1A and 1B. The user interface may include a home tab 121 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 122), contains a series of shortcuts which can link to any web site chosen by the user that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts).

Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with, for example, Accounts, Contacts, or Opportunities among other modules in the system and the system is not limited to a quote being associated with any particular set of modules.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard (such as that shown for example in FIG. 2B) module may be accessed using a dashboard tab 142 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and re-submit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 110 that contains the data of the system and a security module 112 (row level security) that implements the security methods to control access to the data in the database 110 since the database is shared by all users of the system and the data must be segregated based on the users and their access level to different pieces of data. The system may also include a database abstraction layer 114 that is coupled between the database 110 and the SugarBean object 108 and acts as an interface between the database 110 and the SugarBean object 108. The SugarBean object 108 provides the base logic required for retrieving, making available and writing information to/from the database and each module creates subclasses of SugarBean (an example of which was described above) to provide module specific details, module specific data and module specific data views. During the process of retrieving data from the database, the SugarBean 108 makes calls that populate the row level security information into the SQL engine/database management system that retrieves the data.

Once the data is retrieved from the database by the SugarBean object 108, the module uses a template mechanism 118 and a theme 116 to produce the requested presentation (user interface) for the user. The template mechanism reformats the data from the database 110 into a particular form while the theme adjusts the user interface according to the user's preferences.

If, for instance, the user requests an HTML presentation of the detail view of the contact module for a specified contact, the system may perform that request as will now be described. The request of the user is directed to controller named index. php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 112. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 118 and the code for the current user's theme (retrieved by the theme module 116) is used to create the user interface for the presentation of the particular Contact data to the particular user. The resulting user interface then is sent back to the computing device with of client that requested it.

FIG. 1B illustrates more details of the customer relationship management system 100. Like elements shown in FIGS. 1A and 1B have like reference numerals. The system may interface with a typical browser application 103 (being executed by a computing device) that can access the system 100 over the web. For example, the examples of the user interface below are web-based views generated by the system and displayed on a browser application. The system may further comprise an application programming interface (APIs) portion 105, that may preferably use the well known simple object access protocol (SOAP), to interface with other existing system and applications. For example, the APIs may be used to interface to an email plug-in 109, such as an SugarCRM Plug-In for Microsoft Outlook®, that enhances the email program to allow it to interact with the system 100. As shown, the system 100, in one implementation, is implemented on a web server application 107 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 100 may also have an email module 111 capable of sending email via a local program (that may preferably be sendmail) or an email server leveraging the SMTP protocol. As an example, the CRM system described above may incorporate the metadata driven user interface system and method and the implementation of the metadata driven user interface system within the above CRM system is described for illustration purposes although the metadata driven user interface system and method can be implemented in any software system.

Figure 3:
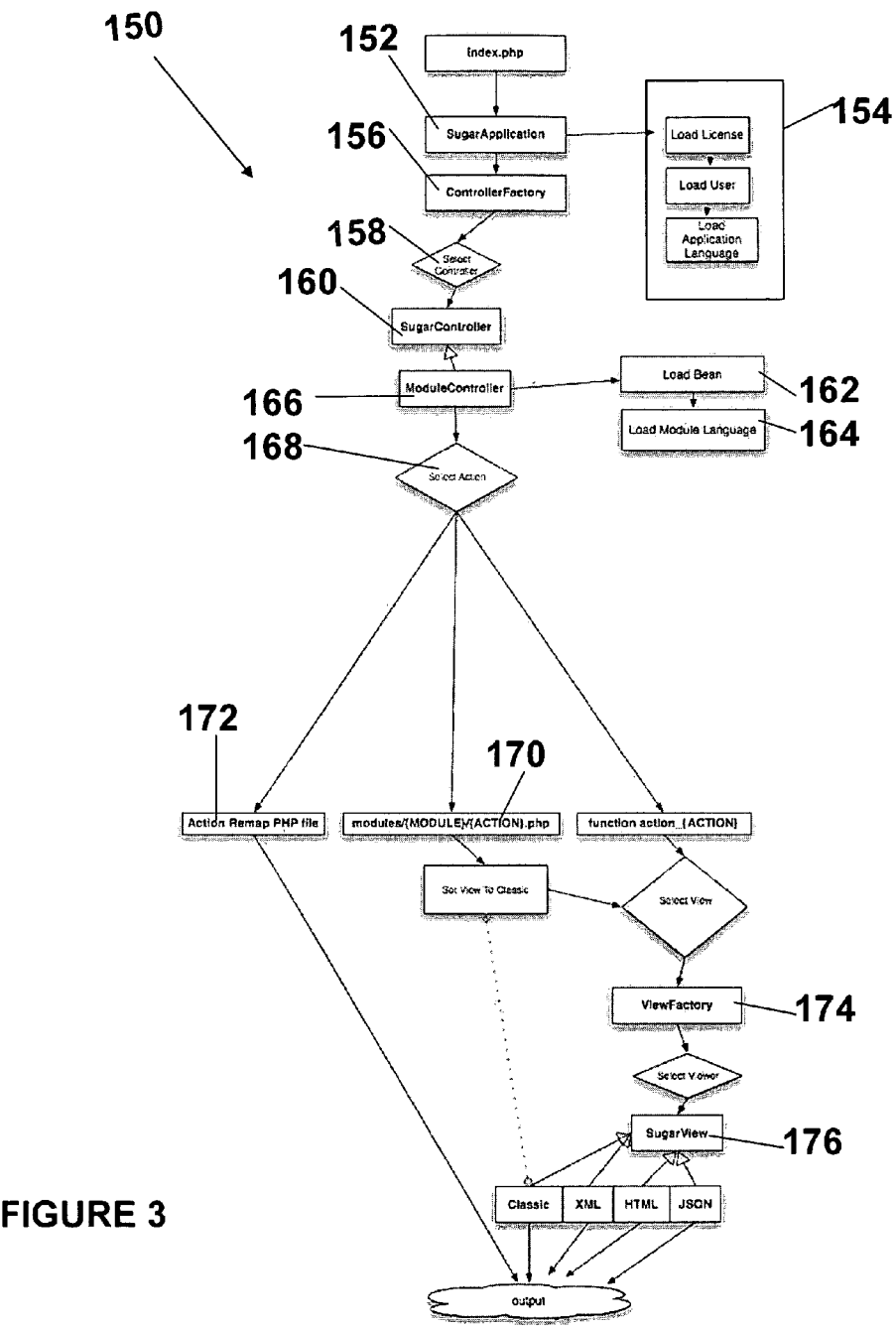
FIG. 3 illustrates a method for metadata driven user interface generation.

FIG. 3 illustrates architecture 150 for implementing a metadata-driven user interface method for the CRM system shown in FIGS. 1A and 1B. The method may be further extended to support generalized software application components, which may require high levels of flexibility and customization. While loosely based on the known Model-View-Controller (MVC) prototype, this method allows for hybrid implementations, extensive data processing, heterogeneous view and layout patterns, customization integration and merge, and other features not currently available in current UI frameworks. This design is especially appropriate in the context of a highly customizable service application environment. The general design encompassing the components of the metadata-driven user interface method provides for extensions to each of the core components of the MVC architecture by defining a convention-based, fall-through discovery algorithm for employing components within the CRM application.

The CRM system as shown in FIGS. 1A and 1B defines a sample application, SugarApplication 152. The Application may be configured to load the user information, languages, themes from the theme module 116, and possibly other components and perform a pre-processing operation (process( ) 154). The preprocess operation may handle any setup logic that would need to be performed before the controller 104 is called. For example, the preProcess( ) may handle the SetTimeZone when a user first logs into the system and the application. Once preprocess( ) is called on the application, preProcess( ) may be invoked on the Controller. This method is empty by default in SugarController, but this gives the developer an opportunity to contribute any special logic prior to the action being handled by the controller itself.

Cascading Controller

As shown in FIGS. 1A and 1B, the controller 104 is the base of all of the classes in an application in a SugarController 160 class. The controller can be implemented on multiple levels within the application, which can be identified by the location of the controller within the application structure, to provide higher flexibility and upgrade safe customization at various points in the application. The CascadingController may allow the application to provide multiple modes of handling for various parts of the system. The application may utilize a ControllerFactory to load the appropriate controller by calling a ControllerFactory operation 156 to select a controller (158) wherein the one or more controllers may be stored in a data store (such as a database 110). The ControllerFactory will go through a discovery algorithm for handling the action, for example the following logic might be used to load the Cascading Controller:

1) check if custom/modules/<my_module>/controller.php exists 2) check if modules/<my_module>/controller.php exists If either of those exists, the system may load the controller defined in the custom folder first and then if that does not exist, load the controller as defined in the module, and if that does not exist, the default SugarController 160. Each of the controllers defined as custom or defined in the module extend the SugarController 160 and provide further information, etc. not provided by the SugarController 160.

Action Handling

Once the controller is loaded, SugarApplication 152 will call a preprocess operation on the controller, which allows the user to inject any logic prior to action handling. Then, SugarApplication will call loadbean( ) 162 on the controller (that, among other operations, loads the module language 164) and then execute on the controller using a module controller 166.

The module controller may then select an action (168) by calling a process( ) operation. The process( ) operation goes through an execution algorithm for handling the action, for example the following logic may be used for handling an action:

1) check if custom/modules/<my_module>/<my_action>.php exists (170). If so, then call action_default( )

2) call handleAction—handle_action will do the following
 i. check for pre_<my_action>( )
 ii. check for action_<my_action>
 iii. check for post_<my_action>

If any of these methods exist either in the SugarController or in the sub-controller then handle action will call it and will return true to process( ).

3) if handle_action( ) returns false, then the action configuration file action_file_map is used. This file may be obtained via a merge of multiple action configuration files that provide concentric level of custom configuration definitions. For example: 'custom/modules/<my_module>/action_file_map.php', modules/<my_module>/action_file_map.php', and 'include/MVC/Controller/action_file_map.php' may be merged. In this example, the file in custom will take precedence over the file in modules, which in turn will supercede the file in include/MVC, since the file in the custom folder should have the most pertinent information.

Once established, the action_file_map array is checked for <my_action> to determine if there is a generic file to be included at this point. (172) If there is a generic file, then the systems bypasses all view handling logic and just includes the file. This is meant to allow for generic handling files like subpanels and popups.

4) If control filters down through all of the above steps then the action is deemed undefined.

Attributable Views

Within each of the actions, the action may be set the $controller→view parameter. Once control passes through the process( ) it will return to execute( ). Execute( ) will check if a redirect_url has been set. If one has been set in an action, then redirect to the URL, otherwise if a redirect has not been set, then check if the view field has been set. If the view field has been set, then call a ViewFactory operation 174 to obtain the appropriate view. Once the controller has the view, the system may call $view→process( ).

As mentioned above, ViewFactory may accept as a parameter the view as set in the controller and find the appropriate view. The ViewFactory 174 may build the appropriate view based on a discovery algorithm, such as defined by the following logic:

1) check if custom/modules/<my_module>/views/view.<my_view>.php exists 2) check if modules/<my_module>/views/view.<my_view>.php exists 3) check if include/MVC/Views/view.<my_view>.php exists It will check in that order and stop processing once it finds one of those views. Each of these views will extend a default SugarView 176. But in addition a developer can also extend an instance view. For example OOTB Sugar has defined view.list.php which is meant to handle ListViews and extends the SugarView. Thus, for the views, there could be two hierarchies.

SugarView.php

```
         |
         <my_module>/views/view.list.php
   OR
   SugarView.php
         |_
          |
          include/MVC/View/views/view.list.php
                |_
                 |
                 <my_module>/views/view.list.php
```

In addition there exist view.<view>.config.php files which allow for customization of the view by defining whether to show the header, javascript, footer, search, subpanels.

By default, SugarView.php may provide a set of baseline definitions as in the following example:

```
$options = array(
              'show_header' => true,
              'show_subpanels' => false,
              'show_search' => true,
              'show_footer' => true,
              'show_javascript' => true,
              );
```

Similarly to the controller design (see the action_file_map.php described above), which is derived from the merge of the customs/modules, modules, and application level definitions, each view may also define a view configuration file view.<view>.config.php, which may have the following exemplary format and attributes:

```
$view_config = array(
    'actions' =>
        array(
            'popup' => array(
                              'show_header' => false,
                              'show_subpanels' => false,
                              'show_search' => false,
                              'show_footer' => false,
                              'show_javascript' => true,
                              ),
            'authenticate' => array(
                              'show_header' => false,
                              'show_subpanels' => false,
                              'show_search' => false,
                              'show_footer' => false,
                              'show_javascript' => true,
                              ),
            'subpanelcreates' => array(
                              'show_header' => false,
                              'show_subpanels' => false,
                              'show_search' => false,
                              'show_footer' => false,
                              'show_javascript' => true,
                              )
        ),
    'req_params' =>
        array(
            'to_pdf' => array('param_value' => true,
                              'config' => array('show_all' =>
                              false),
                              ),
            'to_csv' => array('param_value' => true,
                              'config' => array('show_all' =>
                              false),
                              ),
        ),
);
```

Notably, within this example two array definitions—'actions' and 'req_params'—are defined. When loading the view, ViewFactory will merge all available configuration files to identify the most accurate definition for the above parameters. For example, 'customs/modules/<my_module>/views/view.<my_view>.config.php', 'modules/<my_module>/views/view.<my_view>.config.php', 'include/MVC/View/views/view.<my_view>.config.php' may be merged. The precedence may be assumed to be determined on the basis of granularity of customizations: customs/modules being the most definitive, then modules/, and finally include/MVC.

Request parameters may be matched against the required parameters as they are defined in the view configuration files. In such a case that the request parameters are not available, but the actions are defined in the view configuration file, the view will be configured with those options. Otherwise the default options may be used as they are defined in the base SugarView class.

Pre-Run Time & Runtime Field Modifiers

To implement the metadata driven user interface system, a developer may utilize field modifiers at pre-runtime. Thus, a developer is able to take advantage of the standard modifiers provided for each field, but is also able to add an additional property in the metadata, for example "+Field" or "+Button". These modifiers allow the developer to add additional information to a metadata driven field without writing custom code or using the customCode metadata property. For example, if a developer wishes to add an alert when a user clicks on a name field, the developer may define it as follows, for example:

array('name'=>'name', '+Field'=>array('onclick'=>"alert('hello world');", 'onmouseover'=>"alert('just passing by');"))

A field may have more than one modifier as seen in the example above. For example, if a field has a button, the +Button attribute may be used to set properties of a field with a button. If a field does not have a button and the +Button attribute is used a button will be added next to the field if that field type supports it. It is up to the developer of a given field type to determine if they wish to support a certain attribute.

A developer may also use field modifiers at runtime that modify the value at run time. For example if a developer has an amount field and wishes amounts >1000 to be displayed in green amounts <600 to display in orange and amounts <500 to display in red. The developer can add a filter property to the field as follows:

```
array('name'=>'amount', 'filters'=>array(
    array('filter'=>'>', 'value'=>1000,
        'apply'=>array('color'=>'green')),
    array('filter'=>'<', 'value'=>600,
        'apply'=>array('color'=>'orange')),
    array('filter'=>'<', 'value'=>500, 'apply'=>array('color'=>'red')),
)
);
```

In this system, distinct field types may have different filters and modifiers that can be applied. For example, an email address that is marked as "do not email" is of field type email and may have a strike through style applied to it. These modifiers may be applied to all of the record or just the field itself. For example, in a list view a filter may be applied to the assigned user and if the assigned user is the same as the current user it may highlight the entire row.

Dynamic User Interface Re-Writing, Grouping & Value-Based Inference

Figure 4:
FIG. 4 illustrates an exemplary user interface of the CRM system with required fields defined by the metadata.
Figure 5:
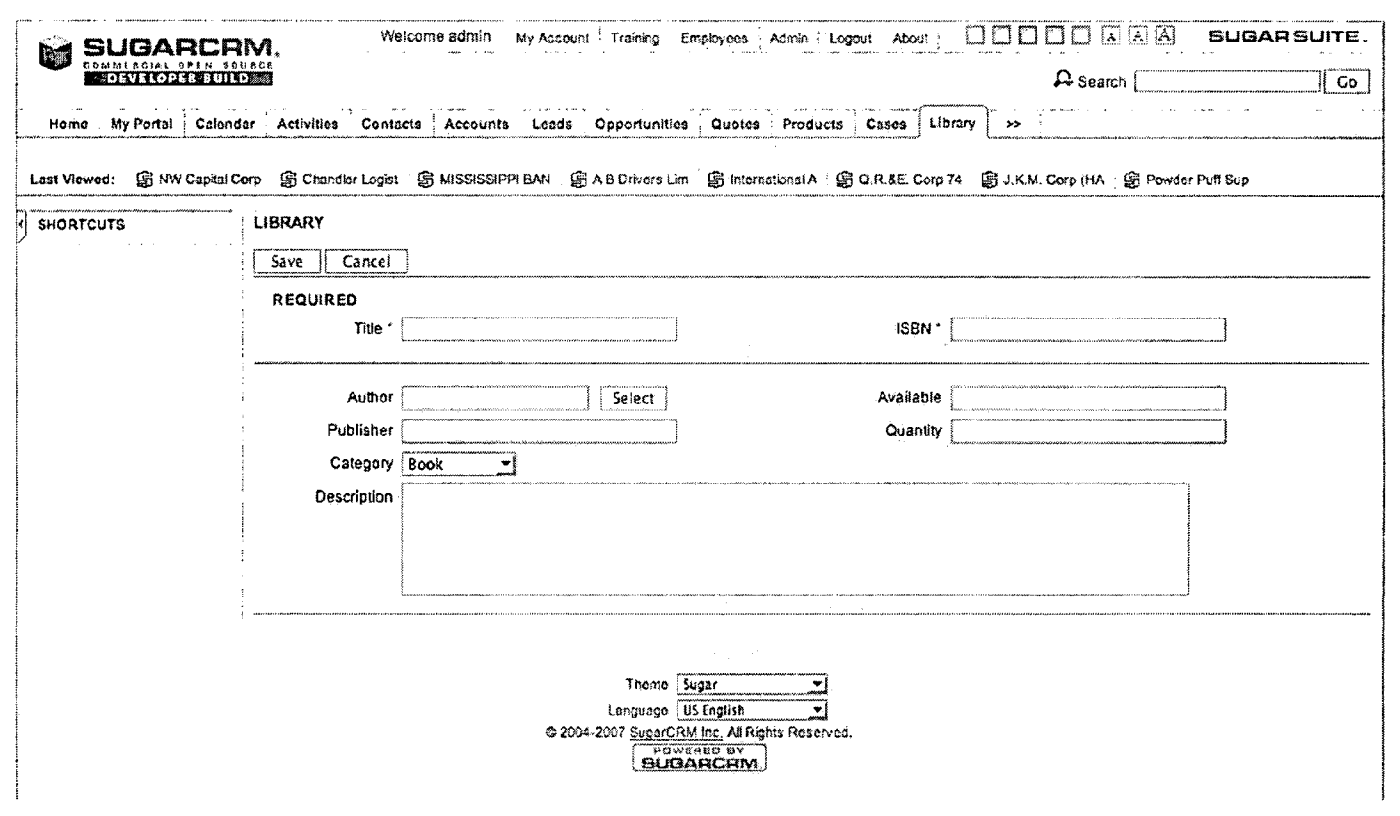

The system may also provide dynamic user interface rewriting and generation that provide the ability to programatically manipulate the data/panel attribute of the template definition to reorder the view of the layout. For example, a required fields first transformation (See FIG. 4 for example) could be applied to ensure that all required fields are displayed in a grouping of required fields followed by the standard layout for all non-required fields. Other transformations could be applied based on field values for example a layout with fields related to a specific drop down value could have those fields highlighted or moved to a prominent area of screen real-estate or even removed entirely depending on the value of the drop down. (See FIG. 5 for example).

Context-Aware Components

The proposed system may allow for creating a fully object-oriented UI that provides each UI component with contextual application and rendering information. Based on these context parameters each component or field may have fully customizable renderer, which may determine the associated view configuration and type. For metadata fields this can be accomplished via a callback to a rendering function that will provide definitive logic to apply the appropriate type in a given context (typically based on the type of view itself). For example, consider a stock quote field that for edit views would render a text box for a symbol but on detail views that field would call a function and display either the stock value or a graph or any other information that is deemed relevant by the function. In this case, for a list view it may display the stock price, and a detail view may display a chart.

Support for Field-Level Security

Figure 6:
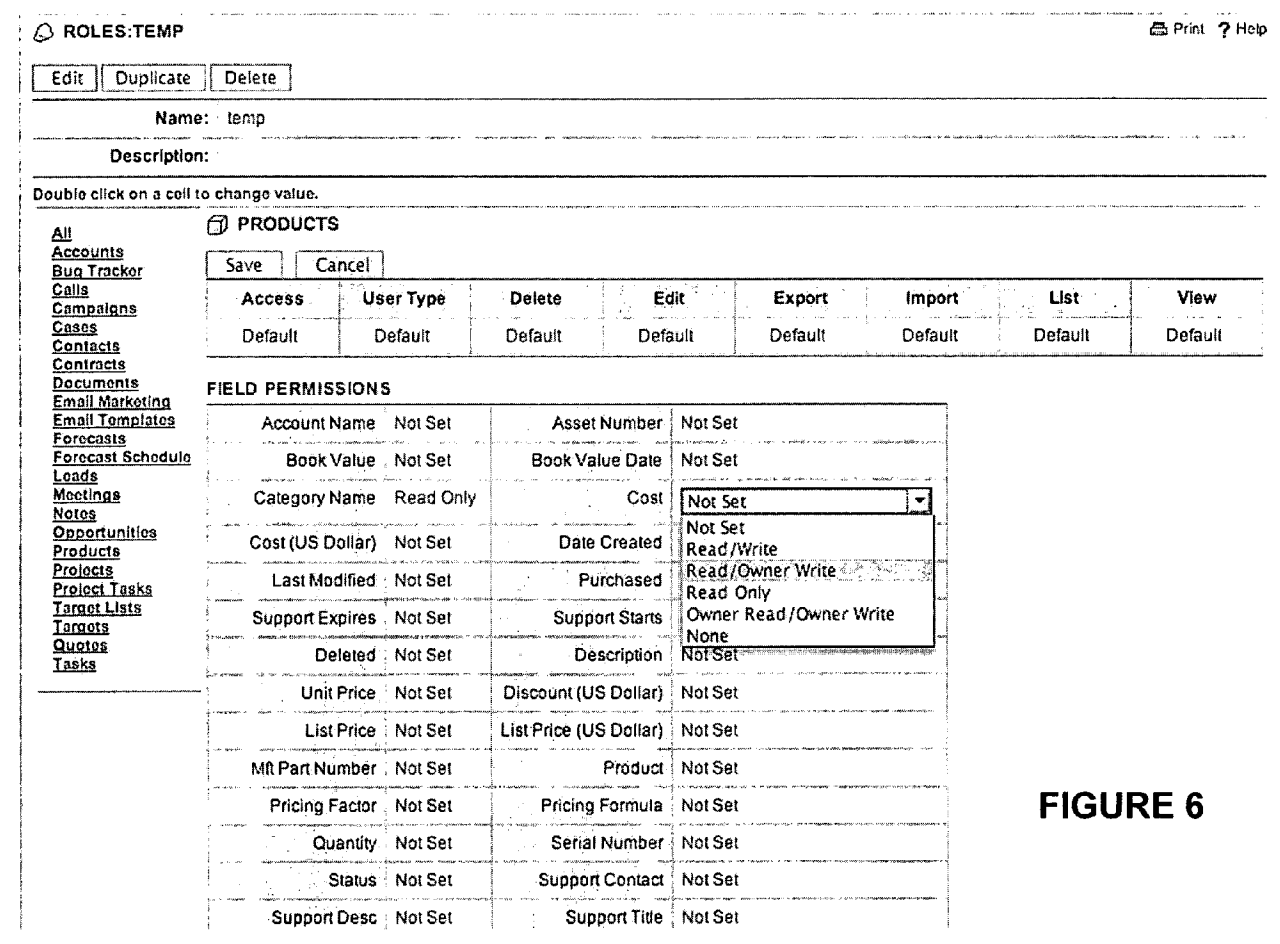

The system may also permit field level security. The field level security provides administrators with a mechanism for controlling what fields a user has access to depending on the roles assigned to the user and the settings of field level access for those respective roles. An example of the user interface for selecting the field level access is shown in FIG. 6. An example of the available access levels are as follows:

1. Not Set—this implies that the role does not have an access level setting for this field
2. Read/Write—this implies that this role allows for reading of the field and writing values to the fields
3. Read/Owner Write—this implies that users can read the field and only the owner of the record can edit the field
4. Read Only—this implies that both the owner and users can only read the field
5. Owner Read/Owner Write—this implies that only the owner can read and write to the field
6. None—this implies that no access is given for this field If a user has multiple roles assigned to them, the most restrictive access may be used by default. This default may be overridden by a system wide configuration setting that an administrator can set to allow the least restrictive access to be used. In the example of the access levels above, "Not Set" has no effect, leaves the access level at default and does not add or remove access. So, "Not Set" is not a true access level so the least restrictive access level would be "Read/Write" and most restrictive access level is "None". Then, the user interface displayed to each user of the system will be adjusted accordingly depending on the level of user access. Thus, a field may not appear in a layout even if it is defined in that layout if a user does not have access to the particular field or has read only rights.

The system may also allow developers to define phantom fields for the field level security. For example, a developer adds a graph at the bottom of a page and wishes only people with certain rights to be able to view this field. To accomplish this, a developer can add a phantom field called cool_graph to the field level security and could check against this phantom fields access level to determine if the graph should be shown or not. The administrator would be able to set the access level on these phantom fields as though they were normal fields.

Administration Management & Configuration

The system may provide an interface to setup and administer metadata components of the model. In this case user-defined elements will be written into custom directories and would take automatically take precedence oven system-wide setting.

To accommodate for field-sprawl common in large applications, the model may also provide for the groupings of fields. The grouping of fields allows for multiple fields to be grouped together so that an administrator has an easier time administrating them. For example, an administrator can define a group called address that would contain street_address, city_address, state_address, zip_code, country and when the permissions for any of those fields is checked it would check against the address group instead of the individual field. In the administration user interface, a group may be displayed in the same fashion as a field would be displayed.

Merges & Upgrades

Each new version of the application might include new and/or modified functionality that may conflict or overwrite customizations implemented on a previous version. The system may implement a priority-based merge/resolution algorithm to resolve and remedy any issues arising from an upgrade process.

To merge a system that has metadata customizations, three versions will need to be considered: the original version, the customized and the new version of the system. The original version is evaluated and all fields are removed that do not appear in either the new or the customized version, since we assume that those fields have been removed by either customization or the upgrade. If the field is present in both the custom and the new version, the location must be considered to position the field properly within the resulting view. The custom location would take priority as per reasoning above. All custom fields that are not in either version may be automatically copied as well. As the final step we overwrite the original files with the new files and write the resultant custom files out.

To accommodate for location conflict that might arise, multiple algorithms can be used. An simple example is attach-at-the-end approach. A more complex resolution may involve a nearest-position approach and would require adding a row adjacent to the current custom location.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A software application system, comprising:
a computing device with a processing unit;
an application having a plurality of lines of computer code wherein the plurality of lines of computer code are executed by the processing unit of the computing device to generate a user interface of the application;
a data store having one or more controllers and one or more views;
the one or more controllers that each control the generation of the application;
a controller factory that selects a particular controller for a particular instantiation of the application using a discovery process of the one or more controllers;

a module controller that selects an action associated with the instantiation of the application based on the selected particular controller; and a view factory that selects a particular view based on the selected action using a discovery process of the one or more views.

2. The system of claim 1, wherein the controller factory selects from a custom controller.

3. The system of claim 1, wherein the controller factory performs the discovery process to select a custom controller for the particular instantiation of the application, select a my module controller and select a default controller if no custom controller and my module controller exists.

4. The system of claim 1, wherein the module controller using a execution process to handle the action.

5. The system of claim 1, wherein the view factory performs the discovery process to select a custom view for the particular instantiation of the application, select a my view and select an MVC view.

6. A method for generating a user interface of a software application system that has a computing device with a processing unit, an application having a plurality of lines of computer code wherein the plurality of lines of computer code are executed by the processing unit of the computing device to generate a user interface of the application, a data store having one or more controllers and one or more views and the one or more controllers that each control the generation of the application, the method comprising:

executing, on a processing unit of the computing device, an application having a plurality of lines of computer code;

discovering, using a controller factory of the software application system being executed on the processing unit, a particular controller for a particular instantiation of the application using a discovery process of the one or more controllers;

selecting, using a module controller of the software application system being executed on the processing unit, an action associated with the instantiation of the application based on the selected particular controller; and discovering, using a view factory of the software application system being executed on the processing unit, a particular view based on the selected action using a discovery process of the one or more views.

7. The method of claim 6, wherein discovering the particular controller further comprises selecting a custom controller.

8. The method of claim 6, wherein discovering the particular controller further comprises selecting a custom controller for the particular instantiation of the application, selecting a my module controller and selecting a default controller if no custom controller and my module controller exists.

9. The method of claim 6 further comprising using, by the module controller, a execution process to handle the action.

10. The method of claim 6, wherein discovering the view further comprises selecting a custom view for the particular instantiation of the application, selecting a my view and selecting an MVC view.

* * * * *